United States Patent Office 3,426,985
Patented Feb. 11, 1969

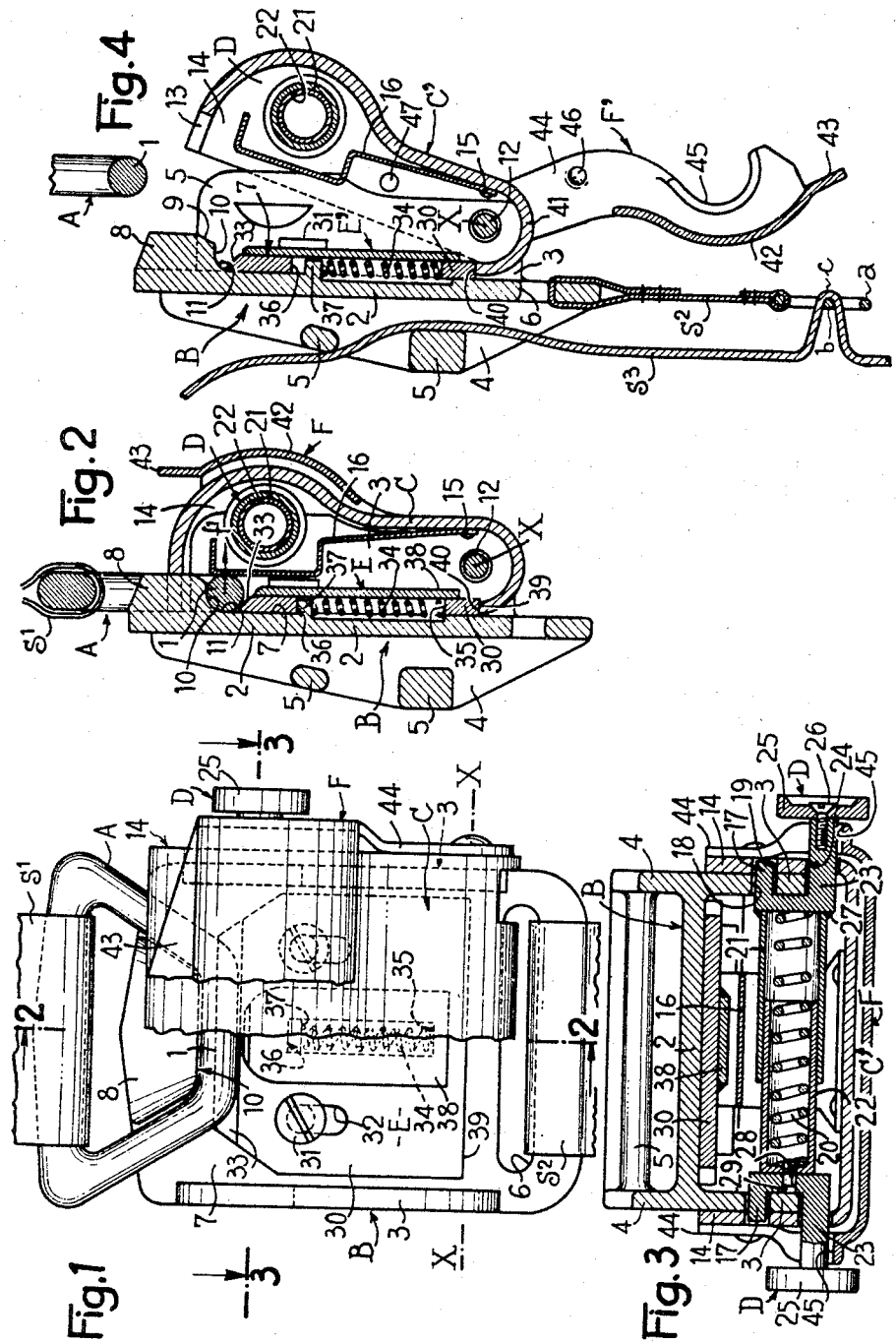

3,426,985
**DETACHABLE FIXING DEVICE FOR A PARA-
CHUTE CANOPY PERMITTING THE PRAC-
TICALLY IMMEDIATE RELEASE OF SAID
CANOPY**
Marcel H. Pravaz, Paris, France, assignor to Etudes et
Fabrications Aeronautiques, Clichy, France
Filed Mar. 27, 1967, Ser. No. 626,068
Claims priority, application France, Apr. 5, 1966, 56,407
U.S. Cl. 244—151                                    5 Claims
Int. Cl. B64d 17/32

ABSTRACT OF THE DISCLOSURE

Detachable fixing device for releasing the canopy from the harness of a parachute, said device comprising two detachable complementary parts one of which comprises a ring and the other a base carrying an abutment having a support face for the ring, said support face being devoid of any projections liable to prevent the ready release of said ring and being exactly perpendicular to the face of said base adjacent said ring, releasable means being provided to maintain said ring against said support face.

---

The present invention relates to detachable fixing devices for detachably fixing the canopy of the parachute to the harness carried by the parachutist, this canopy being permanently fixed to the shroud lines which the aforementioned devices fix to the straps of the harness so that the parachutist can rapidly release this canopy in flight in the event of an incident or as soon as he reaches the ground.

Known detachable fixing devices permitting a very rapid release of the canopy are usually complicated in construction and therefore of high cost. They are, moreover, heavy, more or less convenient to handle and sometimes unreliable as concerns safety, since the release of the rings at the ends of the lines or straps connected to the canopy is not ensured in an absolutely sure manner in all cases.

The object of the invention is to provide an improved device for detachably fixing the canopy of the parachute to the harness of said parachute, said device permitting the very rapid release of the canopy and being simple in construction, relatively light, particularly convenient to use and affording absolute safety. In this device, the abutment which retains said ring carried by one of the straps of the canopy of the parachute has a support face for said ring which is devoid of a cusp or hooking portion and exactly perpendicular to the base which carries said abutment.

Consequently, the ring is not liable to remain hooked to the abutment, particularly in view of the fact that, in accordance with a further feature of the invention, the device further comprises an ejector which is movable relative to the base, normally withdrawn by an elastically yieldable device and cooperates with a heel of the cover pivoted to the base which, in its folded down position, retains the ring, said heel being so arranged that when the cover swings open so as to release said ring, said heel urges said ejector towards said ring so as to automatically eject said ring.

Further features and advantages of the invention will be apparent from the ensuing description with reference to the accompanying drawing.

In the drawing:

FIG. 1 is a front elevational view, with parts cut away, of a detachable fixing device according to the invention;

FIG. 2 is a sectional view, taken along line 2—2 of FIG. 1, of the device in its closed position in which it fixes the line or strap of the parachute canopy;

FIG. 3 is a sectional view, taken along line 3—3 of FIG. 1, of the device in its closed position, and FIG. 4 is a view similar to FIG. 2 of the device in its open position, the ring of the line of the canopy of the parachute having been ejected.

With reference to the drawing, the invention will be described in its application to a device for fixing the canopy of a parachute secured to a number of shroud lines leading to two identical straps, such as the strap $S^1$ (FIGS. 1 and 2), which must be connected to the harness carried by the parachutist, for example in the manner described in French patent application No. 56,408 filed on Apr. 5, 1966 by the applicant, namely by connecting the straps $S^1$ to a short straps $S^2$ which is adjustable along one of the straps $S^3$ which constitute the braces or suspenders of the harness (not shown). The adjustable attachment of the straps $S^2$ to the strap $S^3$ is achieved for example by means of a buckle $a$ having a bar $b$, this buckle being secured to the strap $S^2$ and the strap $S^3$ forming a loop $c$ around the bar $b$.

The strap $S^1$ terminates in a trapezoidal-shaped ring A having a small side portion 1 which is rectilinear and has a circular cross section. This portion 1 is intended to be trapped in the corresponding part of the detachable fixing device which must release the parachute canopy when this device is opened.

This corresponding part comprises a base or sole plate B on which a cover C is mounted to pivot about a transverse axis X—X; the cover C being provided with lateral locking means D for locking it to the base B; an ejecting device E adapted to automatically eject the ring A from the device B–C when the cover C is brought to its open position C′ after withdrawal of the locking means D; and a safety locking element F which prevents the pivoting of the cover C to the position C′ so long as the element F has not been itself pivoted about the axis X—X to the position F′ shown in FIG. 4.

The base B consists of a strong preferably metal member having an H-shaped cross section, as is shown in particular in FIG. 3. The base B comprises a web 2 having on both sides thereof pairs of front and rear flanges 3 and 4 respectively. The rear flanges 4 are connected by two cross-members 5 and form a passage for the strap $S^3$. The web 2 has an opening 6 near its lower end (FIGS. 1, 2 and 4) for the loop of the strap or other flexible tie $S^2$ to which the assembly comprising elements B, C, D, E and F of the device is permanently secured.

The base B carries a projection 8 on the front face 7, namely the face adjacent the ring in FIGS. 2 and 4, and at one end thereof. The projection 8 has a downwardly-facing face including a chamfer 9 adjoining a portion 10 which is perpendicular to the face 7 and constitutes the abutment face for the portion 1 of the ring A. This abutment face 10 is connected to the face 7 by a fillet 11 whose radius is equal to half the diameter of the portion 1 of the ring A.

It will be quite clear that this portion 1-when in the fixed position shown in FIG. 2 in which it is maintained in the manner described hereinafter—is not in any way hooked onto the face 10 so that there is no difficulty in ejecting the portion 1 in the direction of arrow $f_1$ (FIG. 2) when it is released by the device holding it against the fillet 11.

The cover C consists of a pressed member which is mounted on the base B to pivot about an axis X—X by means of a transverse pivot pin 12 carried by the flanges 3 of the base B. At the end of the cover remote from the pin 12, the wall of the cover is notched at 13 so as to straddle the projection 8 of the base B and bear against the face 7 by its lateral walls 14 which are located on each side of the flanges 3 of the base B, as clearly shown in FIG. 3.

Internally, the cover C carries an elastically yieldable strip 16 which is fixed for example by rivets at 15. The strip 16 has a portion which is suitably bent so as to elastically bear against the transverse portion 1 of the ring A and hold this portion trapped against the base B.

In the fixing position of the cover C, namely the position in which the ring A is locked in position, the cover C is held stationary by two lateral locking means D. Each of the latter comprises a locking element 17 which a spring 20 causes to engage inwardly in apertures 18 and 19 formed respectively in the corresponding flange 3 of the base B and in the corresponding wall 14 of the cover C. The spring 20 biases the two locking elements 17 outwardly and is located in two telescopic tubes 21 and 22 (FIGS. 2, 3 and 4).

For the purpose of withdrawing the locking elements 17, each of them is fixed to a slide 23 which is located outside the flange 3 of the base B and slidable in another aperture 24 formed in the corresponding wall 14 of the cover C. This slide terminates in a push-button 25 so that the parachutist—in gripping the two push-buttons between the thumb and index finger of one hand—can urge them together and thereby withdraw the locking element 17 from the apertures 18 and 19 and release the cover C which thereupon swings about the axis X—X to the position shown at C' in FIG. 4.

It will be observed that the push-buttons 25 are attached by screws 26 to the ends of the slides 23. One of the latter is in one piece with, or welded to, the tube 21 at 27 (FIG. 3) and the other tube 23 for purposes of assembly is independent of the slide 23 and the corresponding locking element 17 and carries a centering lug 28 which is engaged upon assembly in a lock 29 formed in the element 17 or 23 or vice versa.

The ejecting device E is provided to facilitate the ejection of the ring A (compare FIGS. 2 and 4) as soon as the cover C has swung to the position C'. This ejecting device comprises a plate 30 which is slidably mounted on the face 7 of the web 2 of the base B against which it is maintained by screws 31 (FIG. 1) relative to which the plate 30 is slidable owning to the provision of elongated apertures 32. The plate 30 terminates at its end adjacent the abutment face 10 and on its front face, namely the face facing the right in FIGS. 2 and 4, in a chamfer 33 adapted to facilitate the ejection of the ring A, as will be explained hereinafter.

The plate 30 is urged downwardly to the position shown in FIGS. 1 and 2 by a spring 34 which is located in an aperture 35 in the plate 30, the position of rest shown in FIGS. 1 and 2 being determined by the downward abutment of the upper end 36 of the aperture 35 against a projection 37 formed on the face 7 of the base B.

It will be observed that the spring 34 is held in position in the aperture 35 by a plate 38 which is attached to the plate 30 by welding or other means.

The bottom end or edge 39 (FIG. 2) of the plate 30 is then in contact with the upper end 40 of a cylindrical heel 41 of the cover C, this heel being centered on the axis X—X.

The safety lockng element F comprises a curved plate 42 which, in the operative position (see in particular FIG. 2), is capable of marrying up with the outer face of the cover C from which it extends upwardly in the form of a tab 43 whereby it can seized by the fingers of one hand of the parachutist. This plate 42 is rigidly secured to two parallel arms 44 which are mounted on each side of the side walls 14 of the cover C to pivot about the pin 12.

It will be observed that each arm 44 is notched at 45 for straddling the corresponding slide 23 and engaging between the corresponding wall 14 of the cover C and the push-button 25.

The safety plate 42 is maintained in its raised operative position by the elastic engagement thereof on the cover in the position C of the latter, for example, by means of two projections 46 on the arms 44 which are engageable, by means of a slight elastic deformation of these arms, in apertures 47 (FIG. 4) provided in the lateral walls 14 (or vice versa).

The device according to the invention operates in the following manner:

With the device in the position shown in FIG. 4 and the cover swung to the position C', the strap $S^1$ connected to the canopy of the parachute is hooked to the harness by introducing the ring A between the base B and the cover C. The latter is then swung to the closed position shown in FIG. 2. As the cover is swung over, the edge 40 of the heel 41 moves downwardly relative to the plate 30 and the latter descends under the action of the spring 34 and thus provides between the chamfer 33, the abutment face 10 and the fillet 11 the cavity for the transverse portion 1 of the buckle or ring A.

At the end of the swinging over of the cover C, the spring 22 causes the locking elements 17 to enter the apertures 18 and 19 of the base B and the cover C respectively, which have come into alignment, and thus lock the cover C in its operative position shown in FIGS. 2 and 3.

It is then sufficient to swing the safety element F upwardly to the position shown in FIG. 2, so that the notches 45 straddle the slides 23 to render impossible any unlocking by a premature depression of the push-buttons 25.

When after having reached the ground the parachutist wishes to detach himself from the canopy of the parachute, he acts on the tab 43 with one hand and first swings the safety device F to the position F' (FIG. 4), thereby releasing the push-buttons 25, and then he urges these push-buttons towards each other and withdraws the locking elements 17 in opposition to the action of the return spring 22 and thereby releases the cover C which he can now swing to the position C' (FIG. 4).

As the cover C swings to the position C', the edge 40 of the heel 41 urges the ejecting plate 37 upwardly and the chamber 33 of this plate ejects the ring A which nothing holds in position owing to the fact that the face 10 is perpendicular to the face 7 of the base B and does not have in any way an undesirable hooking action. The release of the ring A is thus achieved in an absolutely sure manner.

Having now described my invention what I claim as new and desire to secure by Letters Patent is:

1. A detachable fixing device for the canopy of a parachute which permits a very rapid release of said canopy from the harness of the parachute, said device comprising in combination two complementary detachable parts, one of which comprises a ring for connection to one of the straps of said canopy, and the other of which parts comprises a base for connection to the harness of the parachute, said base having a face adjacent said ring in the attached condition of said parts, an abutment in fixed relation to said base, said abutment having a support face in engaging and retaining relation to said ring in the attached condition of said parts and in use of the parachute, said support face being devoid of portions capable of hooking onto said ring and being exactly perpendicular to said face of said base adjacent said ring in said attached condition of said parts whereby said ring is freely disengageable from said support face in moving away from said support face in a direction perpendicular to said face of said base and parallel to said support face, releasable ring-trapping means mounted on said base to move between a closed position in which said means are adjacent said ring and on the opposite side of said ring to said face of said base and trap said ring against said support face and an open position in which said means are spaced away from said ring and allow said ring to freely disengage from said support face, and ejecting means mounted on said base to be movable toward said ring for engaging and exerting a force on said ring having a component capable of urging said ring in a direction parrallel to said support face and away from said base and thereby ejecting said ring from said support face.

2. A detachable fixing device for the canopy of a parachute which permits a very rapid release of said canopy from the harness of the parachute, said device comprising two complementary detachable parts, one of which comprises a ring for connection to one of the straps of said canopy, and the other of which parts comprises a base for connection to the harness of the parachute, said base having a face adjacent said ring in the attached condition of said parts, an abutment in fixed relation to said base, said abutment having a support face in engaging and retaining relation to said ring in the attached condition of said parts and in use of the parachute, said support face being devoid of portions capable of hooking onto said ring and being exactly perpendicular to said face of said base adjacent said ring in said attached condition of said parts, and ejecting means mounted on said base to be movable toward said ring and said support face for engaging and exerting a force on said ring having a component capable of urging said ring in a direction parallel to said support face and away from said base and thereby ejecting said ring from said support face, elastically yieldable means interposed between said base and said ejecting means for biasing said ejecting means away from said ring and away from said support face, a cover pivotally mounted on said base for pivotal movement between a swung-over operative position in which it maintains said ring trapped against said support face of said abutment and a swung-away position for releasing said ring, said cover comprising a heel cooperative with said ejecting means to shift said ejecting means towards said ring and said support face in opposition to the action of said elastically yieldable means so as to automatically eject said ring when said cover is shifted to said swung-away ring-releasing position thereof.

3. A fixing device as claimed in claim 2, wherein the base comprises an opening for securing the base to a flexible element and spaced transverse elements in fixed spaced and parallel relation to the base for receiving a strap of the harness of the parachute and sliding the base along said strap.

4. A detachable fixing device for the canopy of a parachute which permits a very rapid release of said canopy from the harness of the parachute, said device comprising two complementary detachable parts, one of which comprises a ring for connection to one of the straps of said canopy, and the other of which parts comprises a base for connection to the harness of the parachute, an abutment integral with said base, said abutment having a support face for supporting said ring in the attached condition of said parts, said support face being devoid of portions capable of hooking onto said ring and being exactly perpendicular to a face of said base adjacent said ring in said attached condition of said parts, ejecting means movable mounted on said base for ejecting said ring from said abutment, elastically yieldable means interposed between said base and said ejecting means for biasing said ejecting means away from said ring a cover pivotally mounted on said base for pivotal movement between a swung-over operative position in which it maintains said ring trapped against said support face of said abutment and a swung-away position for releasing said ring, said cover comprising a heel cooperative with said ejecting means to shift said ejecting means towards said ring in opposition to the action of said elastically yieldable means so as to automatically eject said ring when said cover is shifted to said swung-away ring-releasing position thereof, and a safety locking means comprising a member pivotally mounted on said base to pivot about an axis substantially coinciding with the pivot axis of said cover to an active position and located on the opposite side of said cover to said base, two locking elements for locking said cover in said operative position thereof, two slides connected to said locking elements and movable inwardly of said cover for rendering said locking elements inoperative, said member comprising two arms having a notch in each arm capable of straddling said slides in said active position of said member and preventing said slides from moving inwardly.

5. A fixing device as claimed in claim 4, further comprising elastically yieldable means for engaging said member with said cover in said active position of said member.

References Cited

UNITED STATES PATENTS

| | | | |
|---|---|---|---|
| 1,199,690 | 9/1916 | Gillan | 24—221 |
| 2,581,557 | 1/1952 | Rozas | 294—83.1 |
| 2,834,083 | 5/1958 | Newell et al. | 24—201 |

FOREIGN PATENTS

| | | |
|---|---|---|
| 696,795 | 1930 | France. |
| 626,294 | 1927 | France. |

MILTON BUCHLER, *Primary Examiner.*

R. A. DORNON, *Assistant Examiner.*

U.S. Cl. X.R.

24—73, 205.17, 230